(No Model.)
E. WESTON.
DEAD BEAT MECHANISM FOR ELECTRICAL MEASURING INSTRUMENTS.
No. 440,289. Patented Nov. 11, 1890.
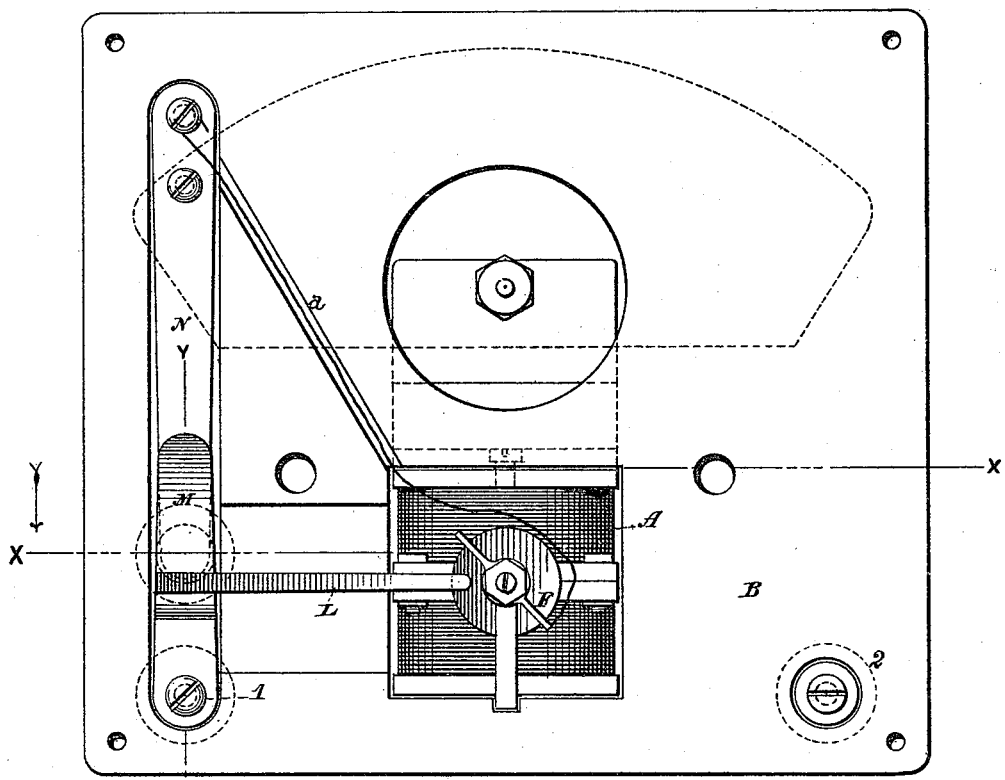
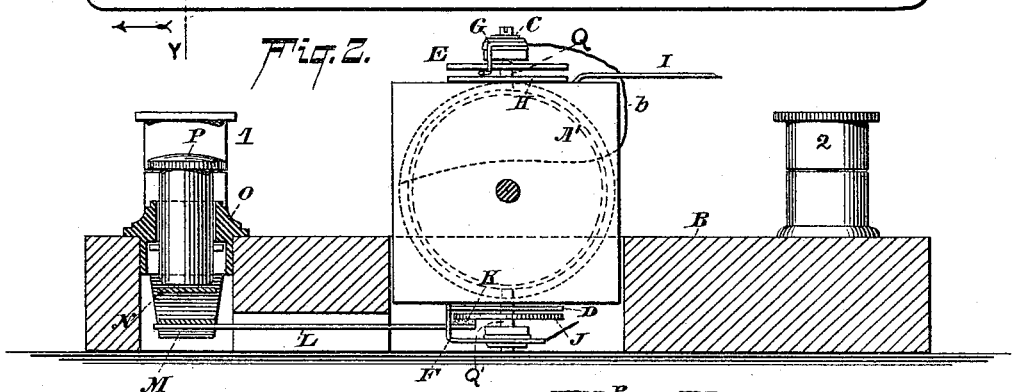
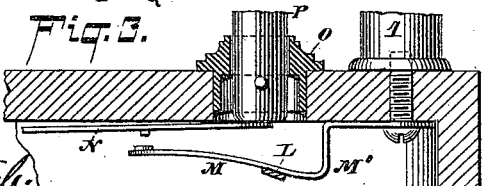
WITNESSES:
Gustave Dieterich
William Goebel.
INVENTOR
Edward Weston
BY Park Benjamin
his
ATTORNEY.

UNITED STATES PATENT OFFICE.

EDWARD WESTON, OF NEWARK, NEW JERSEY.

DEAD-BEAT MECHANISM FOR ELECTRICAL MEASURING-INSTRUMENTS.

SPECIFICATION forming part of Letters Patent No. 440,289, dated November 11, 1890.

Application filed May 12, 1890. Serial No. 351,526. (No model.)

*To all whom it may concern:*

Be it known that I, EDWARD WESTON, of Newark, Essex county, New Jersey, have invented a new and useful Improvement in Dead-Beat Mechanisms for Electrical Measuring-Instruments, of which the following is a specification.

The object of my invention is to retard or dampen the motion of the index or pointer in an electrical measuring-instrument, so that the said index, instead of being thrown rapidly to its marking and then caused to oscillate on the establishment of the current, will move gradually to the point indicated and there come to rest.

My invention consists, first, in the method of retarding the movement of an electrically-actuated body by first establishing the actuating-current, then diminishing a previously-interposed frictional resistance and allowing said body under the influence of the current and opposed by the resistance to move slowly to the indicated point, and then removing said resistance, and, second, in an apparatus whereby said method may be carried into effect, (said apparatus and method being mutually interdependent and related,) and containing, essentially, a body of inductive material supported and vibrating in a field of force, and a means of opposing a frictional resistance to the motion of said body.

In the accompanying drawings, Figure 1 is a bottom view of an electrical measuring-instrument having my improved brake attached. Fig. 2 is a transverse section on the line X X of Fig. 1, taken in the direction of the arrow. Fig. 3 is a section on the line Y Y of Fig. 1.

Similar letters of reference indicate like parts.

The apparatus to which I here show my invention applied is intended for measuring the pressure of alternating currents, and embodies a fixed horizontal coil A, supported on a base-board B. Within the coil A is arranged a vibrating coil A', dotted lines, which is supported on pivots received in arms C. Connected to the pivot-pins Q Q' of the coil at one end are spiral springs D and E. The outer ends of these springs are secured to pivoted arms F and G. The upper pivot-pin of the coil carries a light disk H, to which is secured an index-needle I. The general construction and arrangement of these parts is the same as that set forth in my application for electrical measuring-instrument, Serial No. 337,379, filed January 18, 1890, and the aforesaid structure, therefore, is not herein claimed. Neither do I limit the application of my present invention to the said instrument, because, as will hereinafter be seen, it may be easily applied to any analogous device containing a movable body, the oscillations or rotations of which it may be desired to check or dampen.

On the lower pivot-pin Q' is secured a disk J, having a smoothly-polished surface. Against said disk J bears a pad K of soft leather or like material, which is carried by the light metal arm L. The arm L is secured to a leaf-spring M. This spring is supported at one end on the under side of the base-board, and is bent twice, as shown in Fig. 3. The arm L is secured to the lower portion of said spring near to the angle M'.

N is another leaf-spring, also fastened at one end on the under side of the base-board. The free end of said spring N comes under the lower extremity of a push button or pin P of insulating material, which passes through a sleeve O, arranged in the base-board.

The circuit in the instrument proceeds as follows: From the binding-post 1 to spring M, and then, when the spring N is pushed by pin P into contact with said spring M, to said spring N, to wire *a*, to lower pivoted arm F through the coil A' to arm G, and thence by wire *b* to the fixed coil A, and then to a resistance-coil, (not shown,) and then to binding-post 2.

In operation my brake works as follows: When the pin P is pushed down, the spring N is moved into contact with the spring M and the circuit is closed through the instrument. The initial pressure and consequent friction between the pad K and the disk D is, however, maintained until the pin P is pushed down farther, and then this pressure is slightly relaxed, so that the coil A' is free to turn; but the motion of the coil A' is opposed by the decreased frictional resistance of pad and disk, so that the needle is caused to move slowly up to its reading. When that point is reached, the pin being pushed down to its extreme limit, moves the pad K entirely away from the disk D, leaving the needle entirely free. The needle will then remain at rest without oscillation as long as the current continues.

I claim—

1. The method of retarding the movement of an electrically-actuated body, which consists in first establishing the actuating-current and then diminishing a previously-interposed frictional resistance, and so causing said body to move slowly to a desired point and then removing said resistance.

2. In an electrical measuring-instrument, a body of inductive material supported and vibrating in a field of force, and a means of applying frictional resistance to the movement of said body.

3. In an electrical measuring-instrument, a body of inductive material supported and vibrating in a field of force, a friction-surface on said body, and a brake shoe, pad, or finger bearing on said surface.

4. In an electrical measuring-instrument, a body of inductive material supported and vibrating in a field of force, a brake shoe, pad, or finger, and a spring supporting said finger in contact with said friction-surface.

5. In an electrical measuring-instrument, a conducting-body supported and vibrating in a field of force, a means of applying frictional resistance to the movement of said body, and a means of breaking and making electrical circuit through said conducting-body.

6. In an electrical measuring-instrument, a conducting-body, a second conducting-body moving in the field of force of said first body, the said bodies being in electrical circuit, and a means of applying frictional resistance to the movement of said movable body.

7. In an electrical measuring-instrument, a conducting-body, a second conducting-body moving in the field of force of said first body, the said bodies being in electrical circuit, a circuit-breaker, and a means of applying frictional resistance to the movement of said movable body.

8. In an electrical measuring-instrument, a conducting-body supported and vibrating in a field of force, a means, such as a brake, for applying frictional resistance to the movement of said body, a means of making and breaking electrical circuit through said body, and means for operating said brake and circuit-closer successively.

9. In an electrical measuring-instrument, a conducting-body supported and vibrating in a field of force, a means, such as a brake, for applying frictional resistance to the movement of said body, and a means of making and breaking electrical circuit through said body, the said brake and circuit-closer being constructed and coacting so that the circuit will be established before the brake is released.

10. In an electrical measuring-instrument, a conducting-body supported and vibrating in a field of force, a means, such as a brake, for applying frictional resistance to the movement of said body, and a means of making and breaking an electrical circuit through said body, the said brake and circuit-closer being constructed and coacting so that the brake will be applied before the circuit is broken.

11. In an electrical measuring-instrument, a conducting-body supported and vibrating in a field of force, a means, such as a brake, for applying frictional resistance to the movement of said body, and a means of making and breaking electrical circuit through said body, the said brake and circuit-closer being constructed and coacting so that the circuit will be established before the brake is released and the brake applied before the circuit is broken.

12. In an electrical measuring-instrument, a stationary coil, a coil pivoted within said stationary coil, said coils being connected in circuit, a friction-disk on said movable coil, and a brake shoe, pad, or finger bearing on said disk.

13. In an electrical measuring-instrument, a conducting-body supported and vibrating in a field of force, a friction-surface on said body, a finger bearing on said friction-surface, and two springs N M, the spring M carrying said finger, the said springs and conducting-body being in circuit, the said parts coacting and constructed so that when the spring N is moved into contact with spring M circuit is established, and when the spring N is moved farther in the same direction the impressed movement of spring M carries the said finger out of contact with said friction-surface.

14. In an electrical measuring-instrument, a stationary coil, a movable coil pivoted in the field of force of said stationary coil, disk J on the pivot of said movable coil, arm L, carrying pad or brake shoe K, bearing on disk J, spring M, carrying arm L, spring N, and push-button P, bearing on spring N, said springs N M and the coils being in electrical circuit.

EDWARD WESTON.

Witnesses:
R. C. FESSENDEN,
M. BOSCH.